US012757307B2

(12) United States Patent
Guo et al.

(10) Patent No.: US 12,757,307 B2
(45) **Date of Patent: *Oct. 6, 2026**

(54) FOUR WIRE-TO-TWO WIRE LAMP CONTROL SIGNAL TRANSMISSION SYSTEM AND METHOD

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 43 days.

This patent is subject to a terminal disclaimer.

(21) Appl. No.: 18/898,735

(22) Filed: Sep. 27, 2024

(65) Prior Publication Data

US 2026/0006705 A1 Jan. 1, 2026

(30) Foreign Application Priority Data

Jun. 28, 2024 (CN) ......................... 202410858210.8

(51) Int. Cl.
*H05B 47/185* (2020.01)
*H05B 45/20* (2020.01)
*H05B 45/325* (2020.01)

(52) U.S. Cl.
CPC ........... *H05B 47/185* (2020.01); *H05B 45/20* (2020.01); *H05B 45/325* (2020.01)

(58) Field of Classification Search
CPC ..... H05B 47/185; H05B 45/20; H05B 45/325
USPC ........................................................ 340/12.1
See application file for complete search history.

(56) References Cited

U.S. PATENT DOCUMENTS 5,402,148 A * 3/1995 Post ....................... A61B 5/339 345/698
5,563,654 A * 10/1996 Song ....................... H04N 23/88 348/225.1
6,259,484 B1 * 7/2001 Jiang ....................... H04N 21/47 348/747
6,556,249 B1 * 4/2003 Taylor ....................... H04N 9/83 386/E9.029
7,689,130 B2 * 3/2010 Ashdown ............. H04B 10/116 398/118

(Continued)

*Primary Examiner* — Zhen Y Wu
(74) *Attorney, Agent, or Firm* — Frank Niranjan

(57) ABSTRACT

A four wire-to-two wire lamp control signal transmission method includes: level states of lamp control signals in a four-wire system being synchronously sampled within a preset sampling period, a preset converted signal corresponding to control information carried by the level states of the lamp control signals being generated and encoded to obtain a coded signal superposed onto integrated electric power of the four-wire system to form composite electric power transmitted by a two-wire system to drive a load. Lamp control signal transmission can be achieved without sampling lamp control signals within a complete period. The level states of the lamp control signals are transmitted in the form of the preset converted signal, such that the data transmission quantity can be reduced, and the signals can be transmitted approximately synchronously, solving the problem that a lamp fails to be driven in case of a low duty cycle of lamp control signals.

9 Claims, 7 Drawing Sheets

(56) References Cited

U.S. PATENT DOCUMENTS

| | | | | |
|---|---|---|---|---|
| 8,395,328 | B2 * | 3/2013 | Quick | G09G 3/14 315/312 |
| 2002/0033898 | A1 * | 3/2002 | Dumont | H04N 5/44504 348/E5.1 |
| 2004/0189589 | A1 * | 9/2004 | Park | G03B 33/12 348/E9.026 |
| 2006/0239689 | A1 * | 10/2006 | Ashdown | H04B 10/1141 398/130 |
| 2010/0102734 | A1 * | 4/2010 | Quick | H05B 47/18 315/312 |
| 2011/0248835 | A1 * | 10/2011 | Speegle | H05B 39/08 340/12.32 |
| 2013/0076803 | A1 * | 3/2013 | Lee | G09G 3/3233 345/82 |
| 2013/0234619 | A1 * | 9/2013 | Sempel | H05B 45/20 315/297 |
| 2013/0320855 | A1 * | 12/2013 | Hulett | H05B 45/56 315/113 |
| 2014/0232755 | A1 * | 8/2014 | Wang | G09G 3/20 345/212 |
| 2017/0354022 | A1 * | 12/2017 | Dimberg | H05B 45/20 |
| 2020/0193908 | A1 * | 6/2020 | Liu | G09G 3/3258 |
| 2020/0404227 | A1 * | 12/2020 | Chang | H04N 9/3105 |
| 2023/0049359 | A1 * | 2/2023 | Zou | H05B 45/355 |
| 2023/0326332 | A1 * | 10/2023 | Dong | G08C 19/12 340/12.1 |

* cited by examiner

| R, G, B control information | R00 | 0B0 | 00G | RG0 | R0B | 0GB | RGB |
|---|---|---|---|---|---|---|---|
| duty cycle | 20% | 30% | 40% | 50% | 60% | 70% | 80% |

| R, G, B control information | R00 | 0B0 | 00G | RG0 | R0B | 0GB | RGB |
|---|---|---|---|---|---|---|---|
| frequency | 200K | 300K | 400K | 500K | 600K | 700K | 800K |

FOUR WIRE-TO-TWO WIRE LAMP CONTROL SIGNAL TRANSMISSION SYSTEM AND METHOD

FIELD

The invention relates to the technical field of lamp control signal transmission, in particular to a four wire-to-two wire lamp control signal transmission system and method.

BACKGROUND

A four-wire lamp system is a system that synchronously transmits power and lamp control signals by means of four wires to control the brightness of an LED lamp, and is widely configured for lighting in various indoor and outdoor areas. The four-wire lamp system controls the brightness of an LED lamp by adjusting the duty cycle of lamp control signals and does not have a fixed voltage output, which makes it difficult to realize system expansion. In addition, the four-wire lamp system uses a large number of wires, leading to a high wiring cost and difficulty. In order to reduce the wiring difficulty and cost of lamp systems and increase the utilization rate of original four-wire lamp systems, four-wire lamp systems are often transformed into two-wire lamp systems to be used.

However, according to an existing technical solution for transforming a four-wire lamp system into a two-wire lamp system, lamp control signals within a complete period in the four-wire lamp system need to be sampled and then converted into coded signals, which are then transmitted to the two-wire system. In this process, it is likely that a lamp fails to be driven due to an interruption of power transmission in case of a low duty cycle of the lamp control signals. Moreover, due to the decrease in the number of wires when the four-wire lamp system is transformed into the two-wire lamp system, the volume of data transmitted by wires will be increased greatly, leading to a longer data transmission time and a larger data delay.

SUMMARY

The invention provides a four wire-to-two wire lamp control signal transmission system and method to solve the technical problem of a failure to drive a lamp due to an interruption of power transmission caused by a low duty cycle of lamp control signals when the lamp control signals within a complete period are sampled in a case where a four-wire lamp system is transformed into a two-wire lamp system in the prior art and the technical problems of a long transmission time and a large data delay caused by the increase in the volume of data transmitted by wires during system transformation.

In one aspect, the present invention provides a four wire-to-two wire lamp control signal transmission method comprising: Step S1: synchronously sampling, within a preset sampling period, level states of R (red), G (green) and B (blue) lamp control signals in a four-wire system to obtain level states of current R, G and B lamp control signals, wherein the level states comprise a high level and a low level; Step S2: generating a preset converted signal corresponding to R, G and B control information carried by the level states of the three lamp control signals according to the level states of the R, G, and B lamp control signals, and encoding the preset converted signal to obtain a coded signal; Step S3: integrating electric power of the R, G, and B lamp control signals with power of a driving circuit in the four-wire system to obtain integrated electric power; Step S4: superposing the coded signal onto the integrated electric power to obtain composite electric power that is transmitted by a two-wire system; Step S5: receiving the composite electric power from the two-wire system and performing signal-power separation on the composite electric power to obtain driving power for driving a load, and the coded signal; and Step S6: decoding the coded signal to obtain the preset converted signal, inquiring, based on the preset converted signal, preset R, G and B control information corresponding to the preset converted signal, and outputting R, G and B control signals to the load according to the preset R, G and B control information.

Preferably, in Step S2, the R, G and B control information carried by the level states of the three lamp control signals comprises R00, 0G0, 00B, RG0, R0B, 0GB and RGB; wherein R00 indicates that the R lamp control signal is at the high level and the G lamp control signal and the B lamp control signal are at the low level; 0G0 indicates that the G lamp control signal is at the high level and the R lamp control signal and the B lamp control signal are at the low level; 00B indicates that the B lamp control signal is at the high level and the R lamp control signal and the G lamp control signal are at the low level; RG0 indicates that the R lamp control signal and the G lamp control signal are at the high level and the B lamp control signal is at the low level; R0B indicates that the R lamp control signal and the B lamp control signal are at the high level and the G lamp control signal is at the low level; 0GB indicates that the G lamp control signal and the B lamp control signal are at the high level and the R lamp control signal are at the low level; and RGB indicates that the R lamp control signal, the G lamp control signal and the B lamp control signal are all at the high level.

Preferably, in Step S2, the preset converted signal is a PWM signal with a fixed frequency and a variable duty cycle; and in Step S6, during decoding, the PWM signal with the fixed frequency and the variable duty cycle is obtained based on the coded signal, then the preset R, G and B control information corresponding to the PWM signal with the fixed frequency and the variable duty cycle is inquired, and the R, G and B control signals with a fixed duration are output according to the preset R, G and B control information.

Preferably, in a case where the R, G and B control information carried by the level states of the three lamp control signals is R00, the preset converted signal is a PWM signal with a duty cycle of 20%; in a case where the R, G and B control information carried by the level states of the three lamp control signals is 0G0, the preset converted signal is a PWM signal with a duty cycle of 30%; in a case where the R, G and B control information carried by the level states of the three lamp control signals is 00B, the preset converted signal is a PWM signal with a duty cycle of 40%; in a case where the R, G and B control information carried by the level states of the three lamp control signals is RG0, the preset converted signal is a PWM signal with a duty cycle of 50%; in a case where the R, G and B control information carried by the level states of the three lamp control signals is R0B, the preset converted signal is a PWM signal with a duty cycle of 60%; in a case where the R, G and B control information carried by the level states of the three lamp control signals is 0GB, the preset converted signal is a PWM signal with a duty cycle of 70%; and in a case where the R, G and B control information carried by the level states of the three lamp control signals is RGB, the preset converted signal is a PWM signal with a duty cycle of 80%.

Preferably, in Step S2, the preset converted signal is a PWM signal with a variable frequency; in Step S6, during decoding, the PWM signal with the variable frequency is obtained based on the coded signal, then the preset R, G and B control information corresponding to the PWM signal with the variable frequency is inquired, and the R, G and B control signals with a fixed duration are output according to the preset R, G and B control information.

Preferably, in a case where the R, G and B control information carried by the level states of the three lamp control signals is R00, the preset converted signal is a PWM signal with a frequency of 200 K; in a case where the R, G and B control information carried by the level states of the three lamp control signals is 0G0, the preset converted signal is a PWM signal with a frequency of 300 K; in a case where the R, G and B control information carried by the level states of the three lamp control signals is 00B, the preset converted signal is a PWM signal with a frequency of 400 K; in a case where the R, G and B control information carried by the level states of the three lamp control signals is RG0, the preset converted signal is a PWM signal with a frequency of 500 K; in a case where the R, G and B control information carried by the level states of the three lamp control signals is R0B, the preset converted signal is a PWM signal with a frequency of 600 K; in a case where the R, G and B control information carried by the level states of the three lamp control signals is 0GB, the preset converted signal is a PWM signal with a frequency of 700 K; and in a case where the R, G and B control information carried by the level states of the three lamp control signals is RGB, the preset converted signal is a PWM signal with a frequency of 800 K.

In another aspect, the present invention provides a four wire-to-two wire lamp control signal transmission system, being suitable for the four wire-to-two wire lamp control signal transmission method according to claim 1, the system comprising a four-wire system input module, a sampling MCU, an electric power integration module, a signal superposition module, a two-wire system transmission module and an analysis module; wherein the four-wire system input module is connected to an input terminal of the electric power integration module by means of a first positive wire, an R signal wire, a G signal wire and a B signal wire; an input terminal of the sampling MCU is connected to the R signal wire, the G signal wire and the B signal wire, and an output terminal of the sampling MCU is connected to the signal superposition module; the electric power integration module is sequentially connected to the signal superposition module and the two-wire system transmission module by means of a second positive wire and a first negative wire; a composite output terminal of the two-wire system transmission module is connected to a composite input terminal of the analysis module by means of a signal wire and a second negative wire, a composite output terminal of the analysis module is connected to the load; the four-wire system input module is configured for generating R, G and B lamp control signals and outputting the R, G and B lamp control signals respectively by means of the R signal wire, the G signal wire and the B signal wire; the sampling MCU is configured for sampling level states of the R, G and B lamp control signals to obtain current level states of the R, G and B lamp control signals, generating a preset converted signal corresponding to R, G and B control information carried by the current level states of the R, G and B lamp control signals according to the current level states of the R, G and B current lamp control signals, encoding the preset converted signal to obtain a coded signal and outputting the coded signal to the signal superposition module, wherein the level states comprise a high level and a low level; the electric power integration module is configured for integrating electric power of the R, G and B lamp control signals with electric power of a driving circuit to obtain integrated power; the signal superposition module is configured for superposing the coded signal onto the integrated electric power to obtain composite electric power and outputting the composite electric power to the two-wire system transmission module; the two-wire system transmission module comprises a third positive wire connected to the second positive wire and a third negative wire connected to the first negative wire, and is configured for transmitting the composite electric power and outputting the composition power to the analysis module; the analysis module comprises a signal-power separation unit and a receiving MCU; the signal-power separation unit is configured for receiving the composite electric power and performing signal-power separation on the composite electric power to obtain driving power for driving a load, and the coded signal; the receiving MCU is configured for decoding the coded signal to obtain the preset converted signal, inquiring the preset R, G and B control information corresponding to the preset converted signal, and outputting R, G and B control signals to the load according to the preset R, G and B control information.

Preferably, the four wire-to-two wire lamp control signal transmission system further comprises an energy storage and voltage stabilization module, wherein the energy storage and voltage stabilization module comprises a terminal connected to the second positive wire and the first negative wire, and another terminal connected to the sampling MCU.

Preferably, the signal superposition module comprises a triode, a first resistor, a second resistor, a MOS transistor, a first diode, a second diode and a third resistor; a base of the triode is sequentially connected to the first resistor and the output terminal of the sampling MCU, an emitter of the triode is grounded, a collector of the triode is connected to the second resistor; the first diode is connected in series to the second diode and then connected in parallel to the MOS transistor; the third resistor is connected between a drain and a gate of the MOS transistor and connected to an output terminal of the electric power integration module; and the gate of the MOS transistor is connected to a terminal of the second resistor, and a source of the MOS transistor is connected to an input terminal of the two-wire system transmission module.

The invention has the following beneficial effects: according to the four wire-to-two wire lamp control signal transmission method provided by the invention, level states of R, G and B lamp control signals in a four-wire system are synchronously sampled within a preset sampling period, a preset converted signal corresponding to R, G and B control information carried by the level states of the three lamp control signals is generated and encoded to obtain a coded signal which is superposed onto integrated electric power of the four-wire system to form composite electric power that is transmitted by a two-wire system to drive a load. In this way, in the process of transforming a four-wire lamp system into a two-wire lamp system, lamp control signal transmission can be completed without sampling lamp control signals within a complete period. In addition, the level states of the lamp control signals are transmitted in the form of the preset converted signal, such that the data transmission quantity can be greatly reduced, the signals can be transmitted approximately synchronously and quickly at an extremely low delay, and it is ensured that power is transmitted while the coded signal is transmitted, thus solving the problem that a lamp fails to be driven due to the lack of power of the system during two-wire signal transmission in case of a low duty cycle of lamp control signals.

According to the four wire-to-two wire lamp control signal transmission system provided by the invention, level states of R, G and B lamp control signals in a four-wire system input module are synchronously sampled within a preset sampling period by a sampling MCU, a preset converted signal corresponding to R, G and B control information carried by the level states of the three lamp control signals is generated and encoded to obtain a coded signal to be transmitted; at the same time, power of the three lamp control signals in the four-wire system input module is integrated with driving power by a power integration module to obtain integrated power; then, the integrated electric power and the coded signal are superposed by a signal superposition module to form composite electric power which is output to an analysis module by a two-wire system transmission module. Finally, the analysis module analyzes the composite electric power to control and drive a load. In this way, transformation from a four-wire lamp system to a two-wire lamp system is realized, the wiring cost is reduced, the universality and expandability of the system are improved, the coded signal can be transmitted approximately synchronously at an extremely low delay, the data transmission quantity is reduced, and the problem that the load fails to be driven due to the lack of power of the system in case of a low duty cycle is solved, thus improving the operation stability of the system.

REFERENCE SIGNS

1, four-wire system input module; 2, sampling MCU; 3, power integration module; 4, signal superposition module; 5, analysis module; 51, signal-power separation unit; 52, receiving MCU; 6, lamp; 7, energy storage and voltage stabilization module; 8, two-wire system transmission module.

DESCRIPTION OF THE EMBODIMENTS

The technical solutions in the embodiments of the invention will be clearly and completely described below in conjunction with the accompanying drawings of the embodiments. Obviously, the embodiments in the following description are merely illustrative ones and are not all possible ones of the invention. All other embodiments obtained by those ordinarily skilled in the art based on the following ones without creative labor should also fall within the protection scope of the invention.

Embodiment 1

Figure 1:
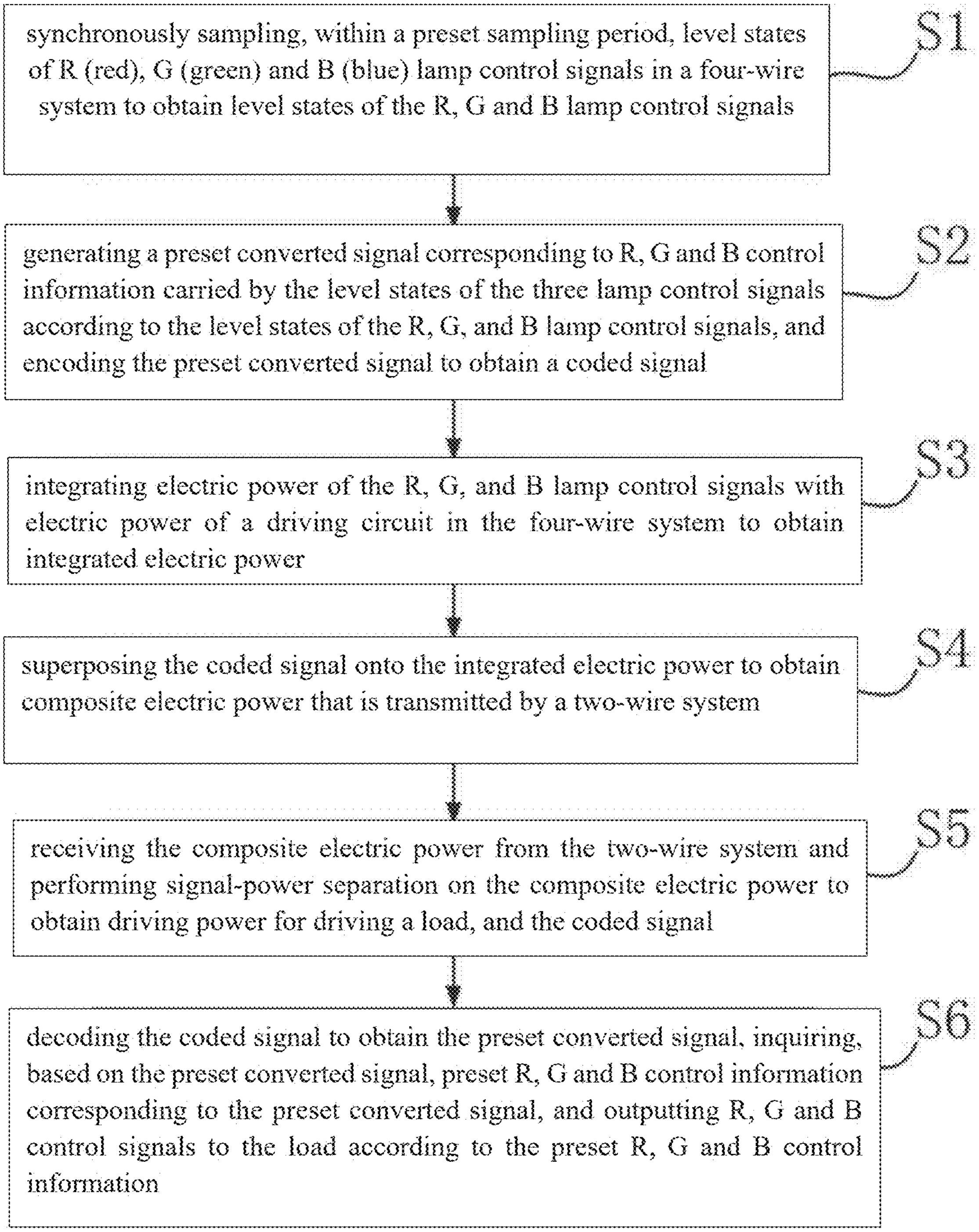
FIG. 1 is a flow diagram of a four wire-to-two wire lamp control signal transmission method according to the invention.

Referring to FIG. 1, the present invention provides a four wire-to-two wire lamp control signal transmission method, which is suitable for system transformation from a four-wire lamp system to a two-wire lamp system. The method comprises Step S1-Step S6.

Specifically, Step S1: level states of R (red), G (green) and B (blue) lamp control signals in a four-wire system are synchronously sampled within a preset sampling period to obtain level states of current R, G and B lamp control signals, wherein the level states comprise a high level and a low level. The synchronous sampling way can accurately capture the level state of each lamp control signal to avoid a delay caused by a deviation of time.

Step S2: a preset converted signal corresponding to R, G and B control information carried by the level states of the three lamp control signals is generated according to the level states of the three lamp control signals, and the preset converted signal is encoded to obtain a coded signal; Step S3: electric power of the three lamp control signals and electric power of a driving circuit in the four-wire system are integrated to obtain integrated electric power. In this embodiment, Step S2 and Step S3 are performed synchronously.

Specifically, in Step S2, the R, G and B control information carried by the level states of the three lamp control signals comprises R00, 0G0, 00B, RG0, R0B, 0GB and RGB.

Wherein, R00 indicates that the R lamp control signal is at the high level and the G lamp control signal and the B lamp control signal are at the low level during sampling; 0G0 indicates that the G lamp control signal is at the high level and the R lamp control signal and the B lamp control signal are at the low level; 00B indicates that the B lamp control signal is at the high level and the R lamp control signal and the G lamp control signal are at the low level; RG0 indicates that the R lamp control signal and the G lamp control signal are at the high level and the B lamp control signal is at the low level; R0B indicates that the R lamp control signal and the B lamp control signal are at the high level and the G lamp control signal is at the low level; 0GB indicates that the G lamp control signal and the B lamp control signal are at the high level and the R lamp control signal are at the low level; RGB indicates that the R lamp control signal, the G lamp control signal and the B lamp control signal are all at the high level.

Figures 2, 3:
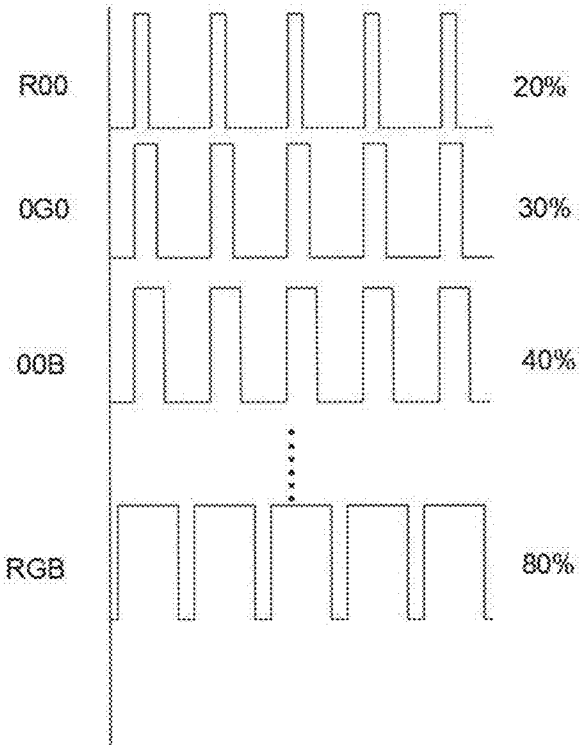
FIG. 2 is a table showing the correspondence between R, G and B control information carried by level states of three lamp control signals and PWM signals with a fixed frequency and different duty cycles according to Embodiment 1 of the invention.
FIG. 3 is a waveform diagram of PWM signals with a fixed frequency and different duty cycles corresponding to R, G and B control information carried by level states of three lamp control signals according to Embodiment 1 of the invention.
Figures 4, 5:
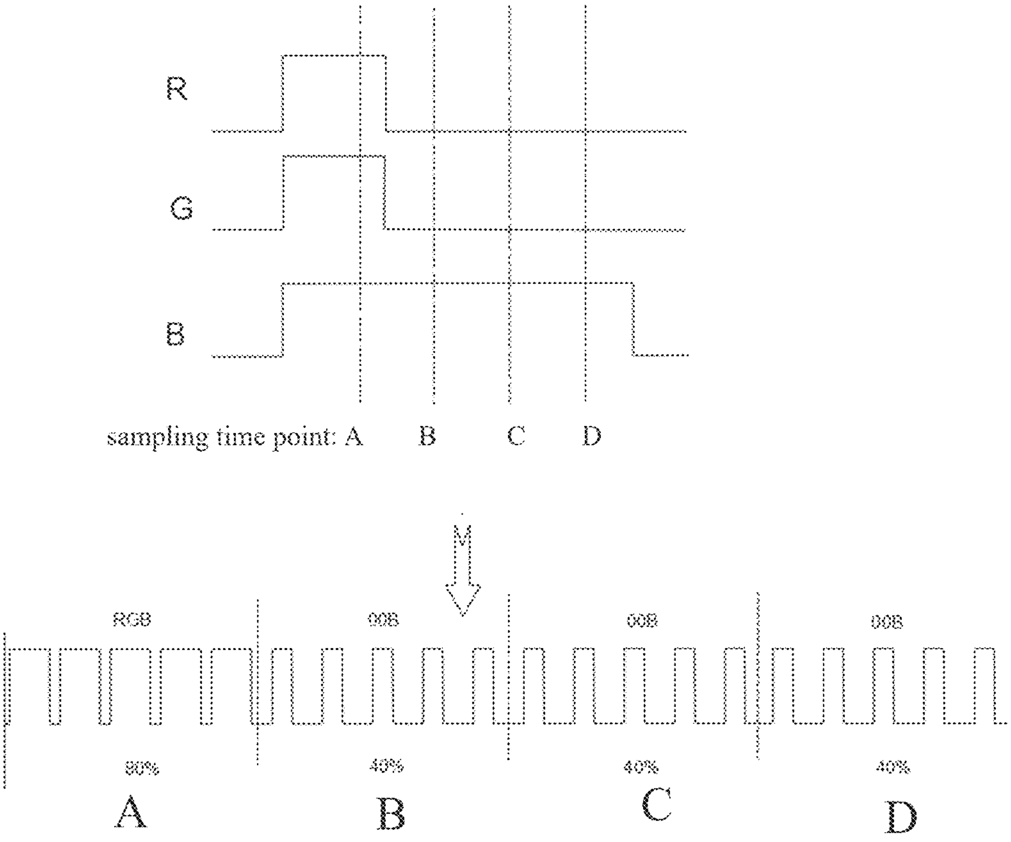
FIG. 4 is a flow diagram of sampling of level states of three lamp control signals according to Embodiment 1 of the invention.
FIG. 5 is a diagram showing the correspondence between R, G and B control information carried by level states of three lamp control signals and PWM signals with different frequencies according to Embodiment 2 of the invention.

Referring to FIGS. 3 and 4, in this embodiment, in Step S2, the preset converted signal is a PWM signal with a fixed frequency and a variable duty cycle. Specifically, in Step S6, during decoding, the PWM signal with the fixed frequency and the variable duty cycle is obtained based on the coded signal, then the R, G and B control information corresponding to the PWM signal with said duty cycle is inquired, and the R, G and B control signals with a fixed duration are output according to the control information.

Within the preset sampling period, a plurality of sampling time points are set to synchronously sample level states of R, G and B lamp control signals in a four-wire system to determine whether current R, G and B lamp control signals are in a high-level state or a low-level state, then a PWM signal with a fixed frequency and a variable duty cycle is generated according to the level states of three lamp control signals sampled at the current sampling point with reference to the waveform diagram of PWM signals with a fixed frequency and different duty cycles corresponding to R, G and B control information carried by level states of three lamp control signals in FIG. 3, and the PWM signal is output as the preset converted signal. For example, in a case where the R, G and B control information carried by the level states of the three acquired lamp control signals is R00, a PWM signal with a duty cycle of 20% is generated and output as the preset converted signal.

The level states of R, G and B lamp control signals in a four-wire system are synchronously sampled within a preset sampling period, and the preset converted signal corresponding to different level states are generated according to sampling results, such that lamp control signal transmission can be realized without sampling original lamp control signals within a complete period and calculating the duty cycle of the lamp control signals, sampling errors and delays caused by an excessively long sampling time can be effectively avoided, and the situation that a lamp fails to be driven due to an error caused by the lack of power transmission of the system during two-wire signal transmission in a case where the lamp control signals remain at a low duty cycle for an excessively long time is avoided. Moreover, the level states of the three lamp control signals are transmitted in the form of the preset converted signal, and the real-time level states of the lamp control signals are transmitted in the form of a corresponding fixed signal, such that the data transmission quantity can be greatly reduced, the data transmission rate is increased, and the signals can be transmitted approximately synchronously and quickly at an extremely delay.

Step S4: the coded signal is superposed onto the integrated electric power to obtain composite electric power to be transmitted by a two-wire system.

Step S5: the composite electric power is received from the two-wire system and signal-power separation is performed on the composite electric power to obtain driving power for driving a load, and the coded signal.

In the present invention, the preset converted signal corresponding to R, G and B control information carried by the level states of the three lamp control signals is generated according to the level states of the R, G and B lamp control signals that are synchronously sampled within the preset sampling period, the preset converted signal is encoded into a coded signal which is then superposed onto the integrated electric power to obtain composite electric power, and the composite electric power is transmitted by the two-wire system, such that system transformation from the four-wire system to the two-wire system is realized, the composite signal and power are synchronously transmitted in the two-wire system, the coded signal and power can be transmitted approximately synchronously at a low delay. Thus, the integrated electric power can still be continuously transmitted in case of a low duty cycle of the lamp control signals, thus satisfying the requirement for driving power of a load and solving the problem that a lamp fails to be driven due to the lack of power of the system during two-wire signal transmission in case of a low duty cycle of the lamp control signals. After the two-wire system performs signal-power separation on the composite electric power, driving power for driving the load and the coded signal carrying load control information are obtained to drive and control the load.

Step S6: the coded signal is decoded to obtain the preset converted signal, the preset R, G and B control information corresponding to the preset converted signal are inquired based on the preset converted signal, and R, G and B control signals corresponding to the preset R, G and B control information are output to the load.

In this embodiment, specifically in Step S6, during decoding, the PWM signal with the fixed frequency and the variable duty cycle is obtained based on the coded signal, then the R, G and B control information corresponding to the PWM signal with said duty cycle is inquired, and the R, G and B control signals with a fixed duration are output according to the control information.

Referring to FIG. 2, when the preset converted signal is obtained, preset R, G and B control information corresponding to the preset converted signal can be obtained according to the duty cycle of the preset converted signal with reference to the correspondence between the R, G and B control information carried by the level states of the three lamp control signals and PWM signals with a fixed frequency and different duty cycles in FIG. 2, and then corresponding R, G and B control signals are output to the load. For example, in a case where a PWM signal with a duty cycle of 20% is obtained based on the coded signal, it can be known, with reference to FIG. 2, that the R, G and B control information carried by the level state of the three lamp control signals corresponding to the PWM signal (the preset converted signal) with the duty cycle of 20% is R00, that is, the R lamp control signal is at the high level, and the G lamp control signal and the B lamp control signal are at the low level.

By cyclically performing Steps S1-S6, periodical sampling, packing and decoding of lamp control signals can be realized to control the load to operate according to set control data.

Embodiment 2

Embodiment 2 is different from Embodiment 1 in the following aspect: in Step S2 of Embodiment 2, the preset converted signal is a PWM signal with a variable frequency.

Figure 6:
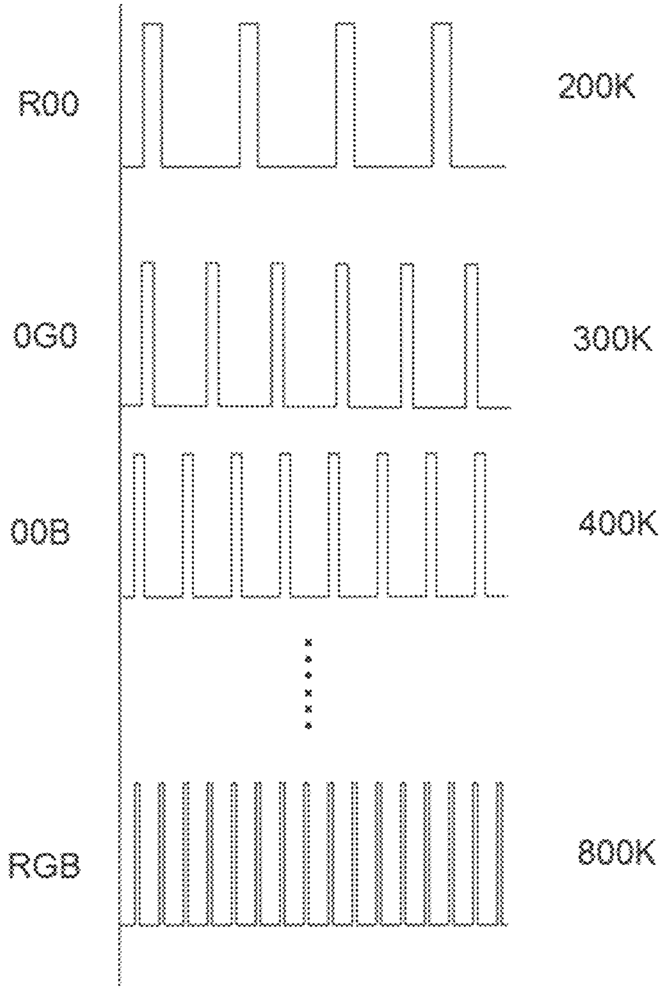
FIG. 6 is a waveform diagram of PWM signals with different frequencies corresponding to R, G and B control information carried by level states of three lamp control signals according to Embodiment 2 of the invention.
Figure 7:
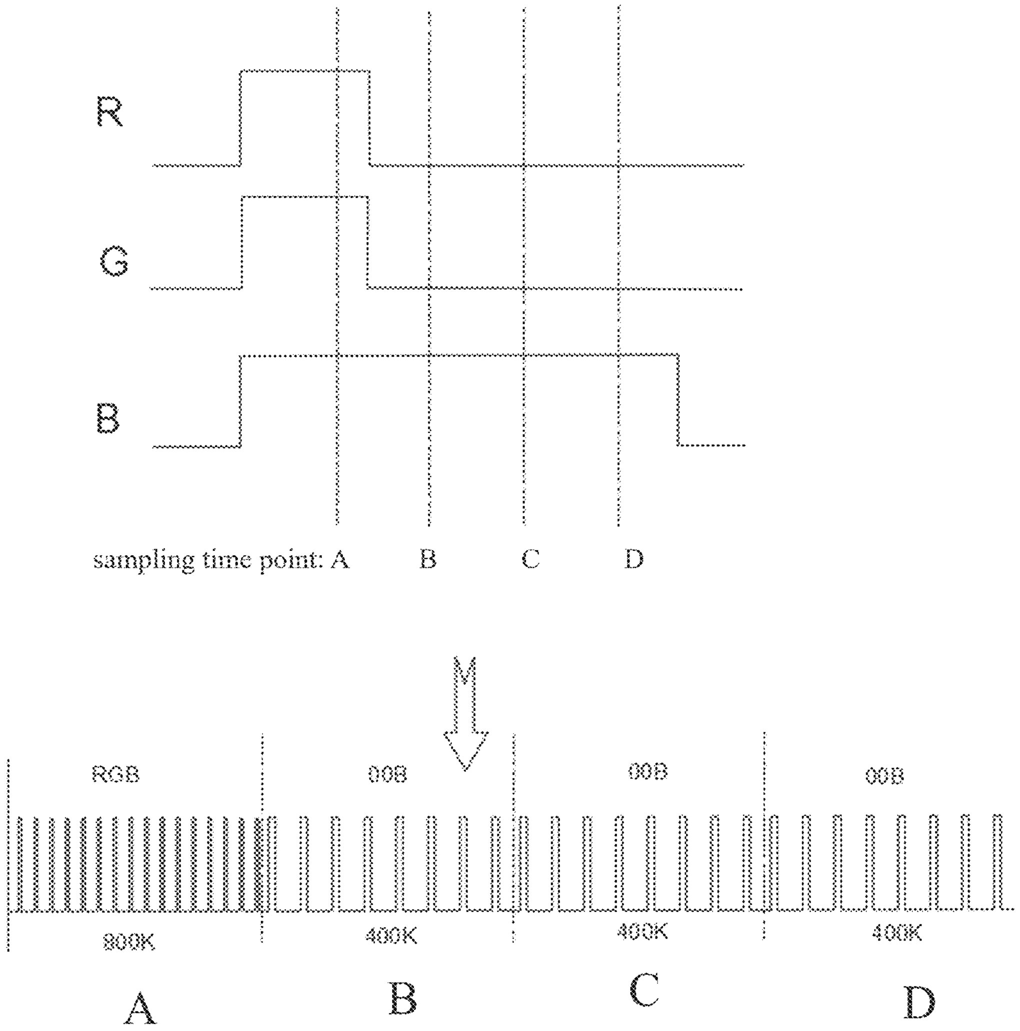
FIG. 7 is a flow diagram of sampling of level states of three lamp control signals according to Embodiment 2 of the invention.

Referring to FIGS. 6 and 7, within a preset sampling period, level states of R, G and B lamp control signals in a four-wire system are synchronously sampled at a plurality of sampling time points to determine whether current R, G and B lamp control signals are in a high-level state or a low-level state, then a PWM signal with a variable frequency is generated according to the level states of three lamp control signals sampled at the current sampling point with reference to the waveform diagram of PWM signals with different frequencies corresponding to R, G and B control information carried by level states of three lamp control signals in FIG. 6, and the PWM signal is output as a preset converted signal. For example, in a case where the R, G and B control information carried by the level states of the three acquired lamp control signals is R00, a PWM signal with a frequency of 200 K is generated and output as the preset converted signal.

Specifically, in Step S6, during decoding, the PWM signal with the variable frequency is obtained based on the coded signal, then the R, G and B control information corresponding to the PWM signal with said frequency is inquired, and the R, G and B control signals with a fixed duration are output according to the control information.

Referring to FIG. 5, when the preset converted signal is obtained, preset R, G and B control information corresponding to the preset converted signal can be obtained according to the duty cycle of the preset converted signal with reference to the correspondence between the R, G and B control information carried by the level states of the three lamp control signals and PWM signals with different frequencies in FIG. 5, and then corresponding R, G and B control signals are output to the load. For example, in a case where a PWM signal with a frequency of 200 K is obtained based on the coded signal, it can be known, with reference to FIG. 5, that the R, G and B control information carried by the level state of the three lamp control signals corresponding to the PWM signal (the preset converted signal) with the frequency of 200 K is R00, that is, the R lamp control signal is at the high level, and the G lamp control signal and the B lamp control signal are at the low level.

Embodiment 3

Figure 8:
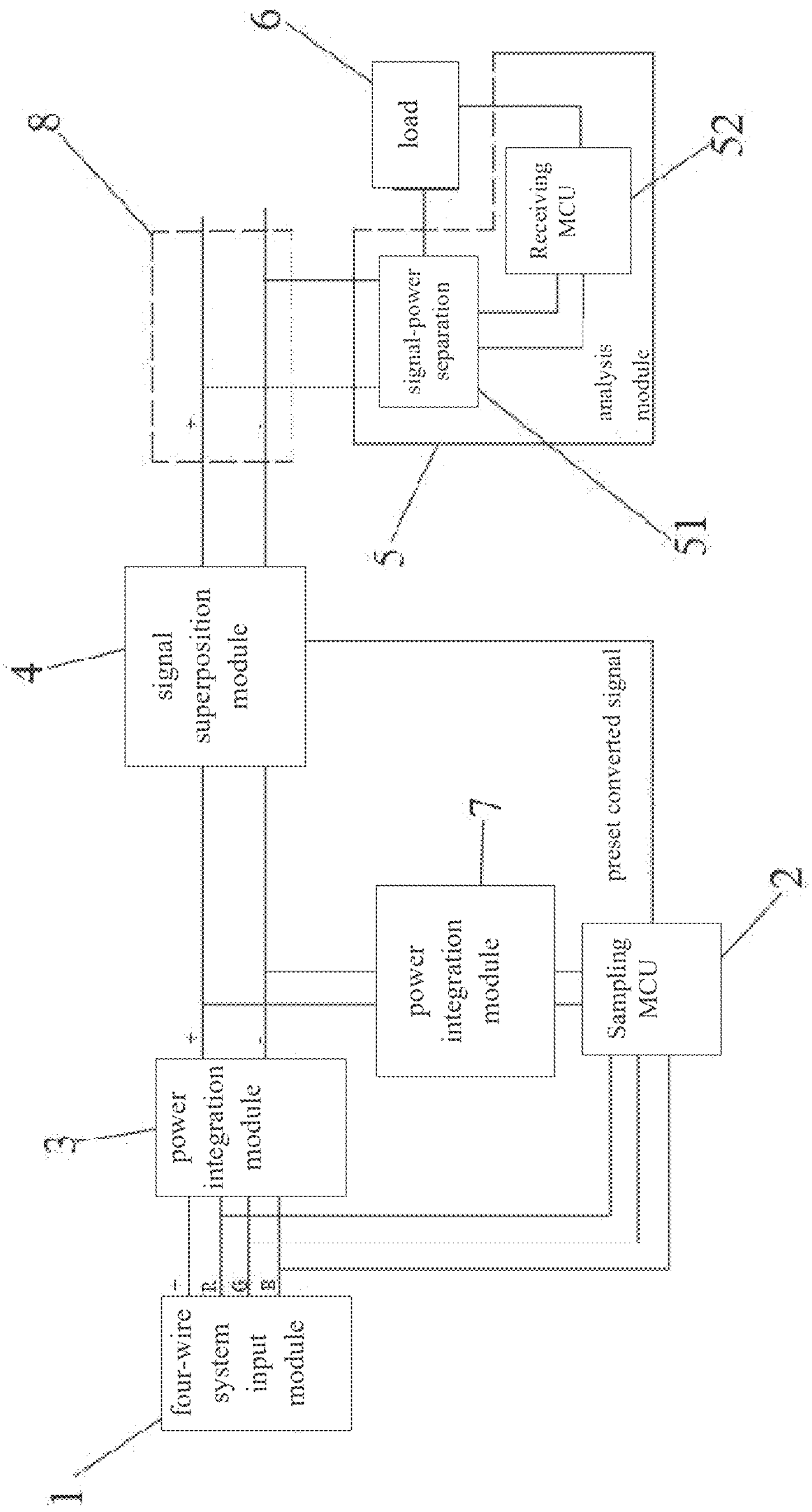
FIG. 8 is a principle diagram of a four wire-to-two wire lamp control signal transmission system according to the invention.

Referring to FIG. 8, the invention further provides a four wire-to-two wire lamp control signal transmission system, which is suitable for the four wire-to-two wire lamp control signal transmission method described above. The system comprises a four-wire system input module 1, a sampling MCU 2, an electric power integration module 3, a signal superposition module 4, a two-wire system transmission module 8 and an analysis module 5.

Specifically, the four-wire system input module 1 is connected to an input terminal of the electric power integration module 3 by means of a first positive wire, an R signal wire, a G signal wire and a B signal wire. An input terminal of the sampling MCU 2 is connected to the R signal wire, the G signal wire and the B signal wire, and an output terminal of the sampling MCU 2 is connected to the signal superposition module 4. The electric power integration module 3 is sequentially connected to the signal superposition module 4 and the two-wire system transmission module 8 by means of a second positive wire and a first negative wire. A composite output terminal of the two-wire system transmission module 8 is connected to a composite input terminal of the analysis module 5 by means of a signal wire and a second negative wire, and a composite output terminal of the analysis module 5 is connected to a load 6 such as a lamp.

The four-wire system input module 1 is configured for generating R (red), G (green) and B (blue) lamp control signals and outputting the R, G and B lamp control signals respectively by means of the R signal wire, the G signal wire and the B signal wire.

The sampling MCU is configured for sampling level states of three lamp control signals to obtain level states of three current lamp control signals, generating a preset converted signal corresponding to R, G and B control information carried by the level states of the three lamp control signals according to the level states of the three current lamp control signals, encoding the preset converted signal to obtain a coded signal and outputting the coded signal to the signal superposition module, wherein the level states comprise a high level and a low level.

The electric power integration module 3 is configured for integrating electric power on the R signal wire, the G signal wire and the B signal wire with driving electric power on the first positive wire to obtain integrated power.

The signal superposition module 4 is configured for superposing the coded signal onto the integrated electric power to obtain composite electric power and outputting the composite electric power to the two-wire system transmission module 8.

The two-wire system transmission module 8 comprises a third positive wire connected to the second positive wire and a third negative wire connected to the first negative wire and is configured for transmitting the composite electric power and outputting composite electric power to the analysis module 5.

The analysis module 5 comprises a signal-power separation unit 51 and a receiving MCU 52, wherein the signal-power separation unit 51 is configured for receiving the composite electric power and performing signal-power separation on the composite electric power to obtain driving power for driving a load, and the coded signal.

The receiving MCU 52 is configured for receiving and decoding the coded signal to obtain the preset converted signal, inquiring, based on the preset converted signal, the preset R, G and B control information corresponding to the preset converted signal, and outputting R, G and B control signals to the load according to the preset R, G and B control information.

The four wire-to-two wire lamp control signal transmission system further comprises an energy storage and voltage stabilization module 7. One terminal of the energy storage and voltage stabilization module 7 is connected to the second positive wire and the first negative wire, and the other terminal of the energy storage and voltage stabilization module 7 is connected to the sampling MCU. The energy storage and voltage stabilization module 7 is configured for performing voltage stabilization and filtering on the coded signal generated and output by the sampling MCU to ensure the quality and stability of the signal.

Figure 9:
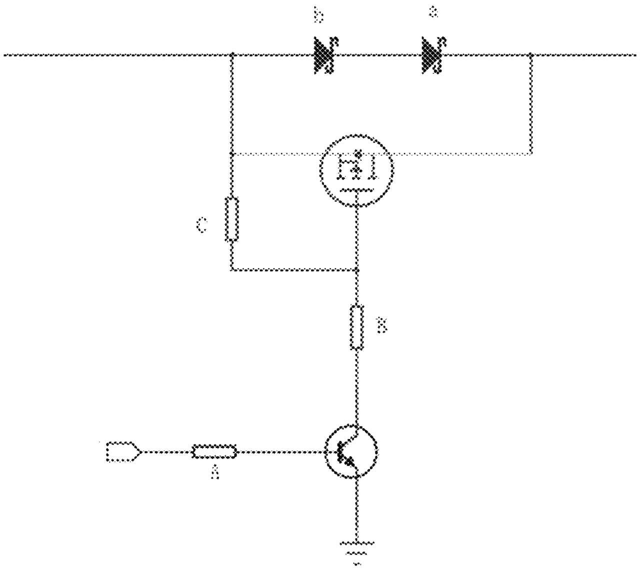
FIG. 9 is a circuit diagram of a signal superposition module according to the invention.

Referring to FIG. 9, the signal superposition module 4 is configured for superposing the coded signal onto the integrated electric power to obtain composite electric power and outputting the composite electric power to the two-wire system transmission module 8. The signal superposition module 4 comprises a triode, a resistor A, a resistor B, an MOS transistor, a diode a, a diode b and a resistor C, wherein a base of the triode is sequentially connected to the resistor A and the output terminal of the sampling MCU, an emitter of the triode is grounded, a collector of the triode is connected to the resistor B, the diode a is connected in series to the diode b and then connected in parallel to the MOS transistor, and the resistor C is connected between a drain and a gate of the MOS transistor and connected to an output terminal of the electric power integration module 3; the gate of the MOS transistor is connected to one terminal of the resistor B, and a source of the MOS transistor is connected to an input terminal of the two-wire system transmission module 8.

According to the four wire-to-two wire lamp control signal transmission system provided by the invention, the level states of R, G and B lamp control signals in the four-wire system input module 1 are synchronously sampled within a preset sampling period by the sampling MCU 2, a preset converted signal corresponding to R, G and B control information carried by the level states of the three lamp control signals is generated and encoded to obtain a coded signal to be transmitted; at the same time, electric power of the three lamp control signals in the four-wire system input module 1 is integrated with driving electric power by the electric power integration module 3 to obtain integrated electric power such that the integrated electric power and the coded signal are superposed by the signal superposition module 4 to form composite electric power which is output to the analysis module 5 by the two-wire system transmission module 8. Finally, the analysis module 5 analyzes the composite electric power to control and drive a load. In this way, transformation from a four-wire lamp system to a two-wire lamp system is realized, the wiring cost is reduced, the universality and expandability of the system are improved, the coded signal can be transmitted approximately synchronously at an extremely low delay, the data transmission quantity is reduced, and the problem that the load fails to be driven due to the lack of power of the system in case of a low duty cycle is solved, thus improving the operation stability of the system.

Although the embodiments of the invention have been illustrated and described above, those ordinarily skilled in the art can make various modifications, amendments, substitutions and transformations to these embodiments without departing from the principle and spirit of the invention, and the scope of the invention should be defined by the appended claims and their equivalents.

What is claimed is:

1. A four wire-to-two wire lamp control signal transmission method, comprising:

Step S1: synchronously sampling, within a preset sampling period, level states of R (red), G (green) and B (blue) lamp control signals in a four-wire system to obtain level states of the R, G and B lamp control signals, wherein the level states comprise a high level and a low level;

Step S2: generating a preset converted signal corresponding to R, G and B control information carried by the level states of the three lamp control signals according to the level states of the R, G, and B lamp control signals, and encoding the preset converted signal to obtain a coded signal;

Step S3: integrating electric power of the R, G, and B lamp control signals with power of a driving circuit in the four-wire system to obtain integrated electric power;

Step S4: superposing the coded signal onto the integrated electric power to obtain composite electric power that is transmitted by a two-wire system;

Step S5: receiving the composite electric power from the two-wire system and performing signal-power separation on the composite electric power to obtain driving power for driving a load, and the coded signal; and Step S6: decoding the coded signal to obtain the preset converted signal, inquiring, based on the preset converted signal, preset R, G and B control information corresponding to the preset converted signal, and outputting R, G and B control signals to the load according to the preset R, G and B control information.

2. The four wire-to-two wire lamp control signal transmission method according to claim 1, wherein in Step S2, the R, G and B control information carried by the level states of the R, G, and B lamp control signals comprises R00, 0G0, 00B, RG0, R0B, 0GB and RGB;

wherein R00 indicates that the R lamp control signal is at the high level and the G lamp control signal and the B lamp control signal are at the low level;

0G0 indicates that the G lamp control signal is at the high level and the R lamp control signal and the B lamp control signal are at the low level;

00B indicates that the B lamp control signal is at the high level and the R lamp control signal and the G lamp control signal are at the low level;

RG0 indicates that the R lamp control signal and the G lamp control signal are at the high level and the B lamp control signal is at the low level;

R0B indicates that the R lamp control signal and the B lamp control signal are at the high level and the G lamp control signal is at the low level;

0GB indicates that the G lamp control signal and the B lamp control signal are at the high level and the R lamp control signal are at the low level; and RGB indicates that the R lamp control signal, the G lamp control signal and the B lamp control signal are all at the high level.

3. The four wire-to-two wire lamp control signal transmission method according to claim 2, wherein in Step S2, the preset converted signal is a PWM (Pulse Width Modulation) signal with a fixed frequency and a variable duty cycle; and in Step S6, during decoding, the PWM signal with the fixed frequency and the variable duty cycle is obtained based on the coded signal, then the preset R, G and B control information corresponding to the PWM signal with the fixed frequency and the variable duty cycle is inquired, and the R, G and B control signals with a fixed duration are output according to the preset R, G and B control information.

4. The four wire-to-two wire lamp control signal transmission method according to claim 3, wherein in a case where the R, G and B control information carried by the level states of the three lamp control signals is R00, the preset converted signal is a PWM signal with a duty cycle of 20%;

in a case where the R, G and B control information carried by the level states of the three lamp control signals is 0G0, the preset converted signal is a PWM signal with a duty cycle of 30%;

in a case where the R, G and B control information carried by the level states of the three lamp control signals is 00B, the preset converted signal is a PWM signal with a duty cycle of 40%;

in a case where the R, G and B control information carried by the level states of the three lamp control signals is RG0, the preset converted signal is a PWM signal with a duty cycle of 50%;

in a case where the R, G and B control information carried by the level states of the three lamp control signals is R0B, the preset converted signal is a PWM signal with a duty cycle of 60%;

in a case where the R, G and B control information carried by the level states of the three lamp control signals is 0GB, the preset converted signal is a PWM signal with a duty cycle of 70%; and in a case where the R, G and B control information carried by the level states of the three lamp control signals is RGB, the preset converted signal is a PWM signal with a duty cycle of 80%.

5. The four wire-to-two wire lamp control signal transmission method according to claim 2, wherein in Step S2, the preset converted signal is a PWM (Pulse Width Modulation) signal with a variable frequency; in Step S6, during decoding, the PWM signal with the variable frequency is obtained based on the coded signal, then the preset R, G and B control information corresponding to the PWM signal with the variable frequency is inquired, and the R, G and B control signals with a fixed duration are output according to the preset R, G and B control information.

6. The four wire-to-two wire lamp control signal transmission method according to claim 5, wherein in a case where the R, G and B control information carried by the level states of the three lamp control signals is R00, the preset converted signal is a PWM signal with a frequency of 200 kilohertz (kHz);

in a case where the R, G and B control information carried by the level states of the three lamp control signals is 0G0, the preset converted signal is a PWM signal with a frequency of 300 KHz;

in a case where the R, G and B control information carried by the level states of the three lamp control signals is 00B, the preset converted signal is a PWM signal with a frequency of 400 KHz;

in a case where the R, G and B control information carried by the level states of the three lamp control signals is RG0, the preset converted signal is a PWM signal with a frequency of 500 kHz;

in a case where the R, G and B control information carried by the level states of the three lamp control signals is R0B, the preset converted signal is a PWM signal with a frequency of 600 kHz;

in a case where the R, G and B control information carried by the level states of the three lamp control signals is 0GB, the preset converted signal is a PWM signal with a frequency of 700 kHz; and in a case where the R, G and B control information carried by the level states of the three lamp control signals is RGB, the preset converted signal is a PWM signal with a frequency of 800 KHz.

7. A four wire-to-two wire lamp control signal transmission system, being suitable for the four wire-to-two wire lamp control signal transmission method according to claim 1, the system comprising a four-wire system input module, a sampling MCU (Microcontroller Unit), an electric power integration module, a signal superposition module, a two-wire system transmission module and an analysis module; wherein, the four-wire system input module is connected to an input terminal of the electric power integration module by means of a first positive wire, an R signal wire, a G signal wire and a B signal wire;

an input terminal of the sampling MCU is connected to the R signal wire, the G signal wire and the B signal wire, and an output terminal of the sampling MCU is connected to the signal superposition module; the electric power integration module is sequentially connected to the signal superposition module and the two-wire system transmission module by means of a second positive wire and a first negative wire; a composite output terminal of the two-wire system transmission module is connected to a composite input terminal of the analysis module by means of a signal wire and a second negative wire, a composite output terminal of the analysis module is connected to the load;

the four-wire system input module is configured for generating R, G and B lamp control signals and outputting the R, G and B lamp control signals respectively by means of the R signal wire, the G signal wire and the B signal wire;

the sampling MCU is configured for sampling level states of the R, G and B lamp control signals to obtain current level states of the R, G and B lamp control signals, generating a preset converted signal corresponding to R, G and B control information carried by the current level states of the R, G and B lamp control signals according to the current level states of the R, G and B current lamp control signals, encoding the preset converted signal to obtain a coded signal and outputting the coded signal to the signal superposition module, wherein the level states comprise a high level and a low level;

the electric power integration module is configured for integrating electric power of the R, G and B lamp control signals with electric power of a driving circuit to obtain integrated power;

the signal superposition module is configured for superposing the coded signal onto the integrated electric power to obtain composite electric power and outputting the composite electric power to the two-wire system transmission module;

the two-wire system transmission module comprises a third positive wire connected to the second positive wire and a third negative wire connected to the first negative wire, and is configured for transmitting the composite electric power and outputting the composition power to the analysis module;

the analysis module comprises a signal-power separation unit and a receiving MCU; the signal-power separation unit is configured for receiving the composite electric power and performing signal-power separation on the composite electric power to obtain driving power for driving a load, and the coded signal;

the receiving MCU is configured for decoding the coded signal to obtain the preset converted signal, inquiring the preset R, G and B control information corresponding to the preset converted signal, and outputting R, G and B control signals to the load according to the preset R, G and B control information.

8. The four wire-to-two wire lamp control signal transmission system according to claim 7, further comprising an energy storage and voltage stabilization module, wherein the energy storage and voltage stabilization module has a terminal connected to the second positive wire and the first negative wire, and another terminal connected to the sampling MCU.

9. The four wire-to-two wire lamp control signal transmission system according to claim 7, wherein the signal superposition module comprises a triode, a first resistor, a second resistor, a MOS (Metal-Oxide-Semiconductor) transistor, a first diode, a second diode and a third resistor;

a base of the triode is sequentially connected to the first resistor and the output terminal of the sampling MCU, an emitter of the triode is grounded, a collector of the triode is connected to the second resistor;

the first diode is connected in series to the second diode and then connected in parallel to the MOS transistor;

the third resistor is connected between a drain and a gate of the MOS transistor and connected to an output terminal of the electric power integration module; and the gate of the MOS transistor is connected to a terminal of the second resistor, and a source of the MOS transistor is connected to an input terminal of the two-wire system transmission module.

* * * * *